(12) United States Patent
Fleming et al.

(10) Patent No.: US 8,674,993 B1
(45) Date of Patent: Mar. 18, 2014

(54) GRAPH DATABASE SYSTEM AND METHOD FOR FACILITATING FINANCIAL AND CORPORATE RELATIONSHIP ANALYSIS

(75) Inventors: John Fleming, Mexico City (MX); Sean Levy, Yucatám (MX); Pranab Nag, Pittsburgh, PA (US); Diego Villarreal, Mexico City (MX)

(73) Assignee: John Fleming, Tornoto (CA)

( * ) Notice: Subject to any disclaimer, the term of this patent is extended or adjusted under 35 U.S.C. 154(b) by 491 days.

(21) Appl. No.: 12/903,932

(22) Filed: Oct. 13, 2010

Related U.S. Application Data

(60) Provisional application No. 61/251,576, filed on Oct. 14, 2009, provisional application No. 61/251,580, filed on Oct. 14, 2009, provisional application No. 61/258,683, filed on Nov. 6, 2009.

(51) Int. Cl.
    *G06T 11/20* (2006.01)
(52) U.S. Cl.
    USPC ............................. 345/440; 707/725; 707/794
(58) Field of Classification Search
    USPC .................................. 345/440; 707/794, 725
    See application file for complete search history.

(56) References Cited

U.S. PATENT DOCUMENTS

| | | |
|---|---|---|
| 5,778,370 A | 7/1998 | Emerson |
| 6,349,291 B1 | 2/2002 | Varma |
| 6,711,577 B1 | 3/2004 | Wong et al. |
| 6,856,973 B1 | 2/2005 | Bott |
| 6,856,992 B2 | 2/2005 | Britton et al. |
| 6,925,457 B2 | 8/2005 | Britton et al. |
| 6,985,890 B2 | 1/2006 | Inokuchi |
| 7,099,838 B1 | 8/2006 | Gastineau et al. |
| 7,143,091 B2 | 11/2006 | Charnock et al. |
| 7,146,337 B1 | 12/2006 | Ward et al. |
| 7,672,865 B2 | 3/2010 | Kumar et al. |
| 7,756,807 B1 | 7/2010 | Komissarchik et al. |
| 2004/0066409 A1 | 4/2004 | Zingale et al. |
| 2004/0090472 A1* | 5/2004 | Risch et al. ................... 345/853 |
| 2005/0004813 A1* | 1/2005 | Gvelesiani ....................... 705/1 |
| 2008/0276221 A1* | 11/2008 | Lev et al. ..................... 717/120 |

OTHER PUBLICATIONS

Sirin, et al.; Pellet: A Practical OWL-DL Reasoner; University of Maryland MIND Lab (Jun. 2007).
Hobbs, et al.; Open-Domain Information Extraction from Business News; http://www.isi.edu/~hobbs/open-domain/node1.html (Feb. 10, 2007).
Friedman-Hill, Ernest J.; Jess® the Rule Engine for the Java TM Platform; Sandia National Laboratories (Dec. 21, 2006).
Sheth, Amit; Semantic Web Application in Financial Industry, Government, Health Care and Life Sciences; LSDIS Lab, Department of Computer Science, University of Georgia (Mar. 2006).
Battiston, Stefano; Shareholding Networks; presented at Exystence Thematic Institute, Information Society Technologies, Budapest, Hungary (Jun. 9, 2004).

(Continued)

*Primary Examiner* — Maurice L McDowell, Jr.
(74) *Attorney, Agent, or Firm* — Baker Botts L.L.P.

(57) ABSTRACT

In accordance with the present disclosure, a system and method for providing an analytical and visual depiction of relationship data is presented. The method includes providing a plurality of graph objects corresponding to relationship data. Each of the graph objects may be categorized. At least some of the graph objects may then be displayed in a visual form that represents a network structure. The visual form may be determined, at least in part, according to the categorization of each of the graph objects.

18 Claims, 12 Drawing Sheets

(56) References Cited

OTHER PUBLICATIONS

Castells, et al.; Semantic Web Technologies for Economic and Financial Information Management; Spanish Ministry of Science and Technology (2004).

Leary, et al.; Towards a Financial Fraud Ontology a Legal Modelling Approach; Joseph Bell Centre for Forensic Statistics and Legal Reasoning, School of Law, University of Edinburgh (2003).

Frank, William and Karunaratne, Anil; A Decade of Modeling Financial Vehicles; Financial Systems Architects (2000).

* cited by examiner

GRAPH DATABASE SYSTEM AND METHOD FOR FACILITATING FINANCIAL AND CORPORATE RELATIONSHIP ANALYSIS

CROSS-REFERENCE

This application claims priority to Provisional U.S. Patent Application Ser. No. 61/251,576 entitled "A Data Representation for Facilitating Financial and Corporate Analysis" which was filed on Oct. 14, 2009, Provisional U.S. Patent Application Ser. No. 61/251,580 entitled "A Graph Database System for Facilitating Financial and Corporate Relationship Analysis" which was filed Oct. 14, 2009, and Provisional U.S. Patent Application Ser. No. 61/258,683 entitled "A Graph Database System for Facilitating Financial and Corporate Relationship Analysis and Visual Interface for the Same" which was filed on Nov. 6, 2009, all of which are herein incorporated by reference in their entirety.

TECHNICAL FIELD

The present disclosure relates generally to the operation of computer systems and information handling systems, and, more particularly, to A Graph Database System and Method for Facilitating Financial and Corporate Relationship Analysis.

BACKGROUND

Financial networks are complex, opaque, and full of unknown information and variables. Large financial institutions have hundreds or even thousands of subsidiaries, issue hundreds or thousands of securities, and are tightly interconnected to thousands of institutions through millions of transactions and parallel relationships. Hedge funds, insurers and other financial institutions must navigate these interconnections on a daily basis, and problems in one institution can quickly transmit throughout the financial system, impacting any number of other institutions in their wake. Understanding and managing these interconnections is critical for many key functions in finance, including investment analysis, risk management, and financial supervision. For example, investment analysts need a clear, detailed understanding of securities issuers and guarantors to calculate values and expected returns on both equity and fixed income investments. Yet, institutions struggle to understand and analyze the complex web of relationships that are fundamental to their daily operations.

Financial analysis involves many diverse disciplines and requires data of various kinds, from a wide array of sources. The existing processes for gathering and structuring this information for use in analysis is manual, ad-hoc and frequently difficult to repeat or update. For example, when the data has already been structured it is typically stored in relational databases, spreadsheets, and other table-based systems. Unstructured data, such as that found in legal documents (SEC filings, court documents, etc.) is also frequently essential, and is even harder to gather, maintain and use. Existing analytical tools typically make the assumption that information regarding financial relationships is fundamentally hierarchical in nature, an assumption that is frequently and increasingly false. Additionally, existing analytical tools are poorly-suited to represent complex network structures that contain data at various levels of granularity, e.g. complex corporate ownership structures, debtor/creditor relationship networks, complex financial transactions that cross various kinds of boundaries, etc.

While relational databases are still the dominant technology used to store and query data used to analyze these kinds of situations, the rigidity of the table structures that must be used make analytics more difficult to implement and evolve. Object-oriented databases, which first emerged commercially in the 1990's, do not improve the situation in a substantive way. Rather, they are still based on rigid definitions of object structures, and are, if anything, even less convenient to query than relational databases. Querying relational databases and using full-text search are both well-understood techniques, but integrating the results of queries against multiple relational databases that do not share a common structure is time-consuming and difficult; adding data found from full-text search into the mix is done ad-hoc by individual analysts with varying degrees of success. In summary, many current tools and techniques lack both the necessary speed and flexibility to analyze and visualize networks of relationships in the financial world.

SUMMARY

In accordance with the present disclosure, a system and method for providing an analytical and visual depiction of relationship data is presented. The method includes providing a plurality of graph objects corresponding to relationship data. Each of the graph objects may be categorized. At least some of the graph objects may then be displayed in a visual form that represents a network structure. The visual form may be determined, in part, according to the categorization of each of the graph objects.

The system and method disclosed herein is advantageous because it can store, manage and represent a plurality of complex relationships in the financial world, including those between companies, financial instruments and people. The data corresponding to real-world relationships may be stored in a database in a structure corresponding to the relationships that exits is the financial and corporate world, making manipulation, searching and representation of the data in the database more efficient and effective. In some embodiments, the graph engine may include an ontological structure which is represented in the same manner as the financial relationship data. This provides a platform on which to design advanced analytics, querying and data input, which increases the utility of the representations presented to a user and the overall computational power of the graph engine. The system is fast and scalable, and can thus analyze millions or billions of relationships quickly, accurately and flexibly. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
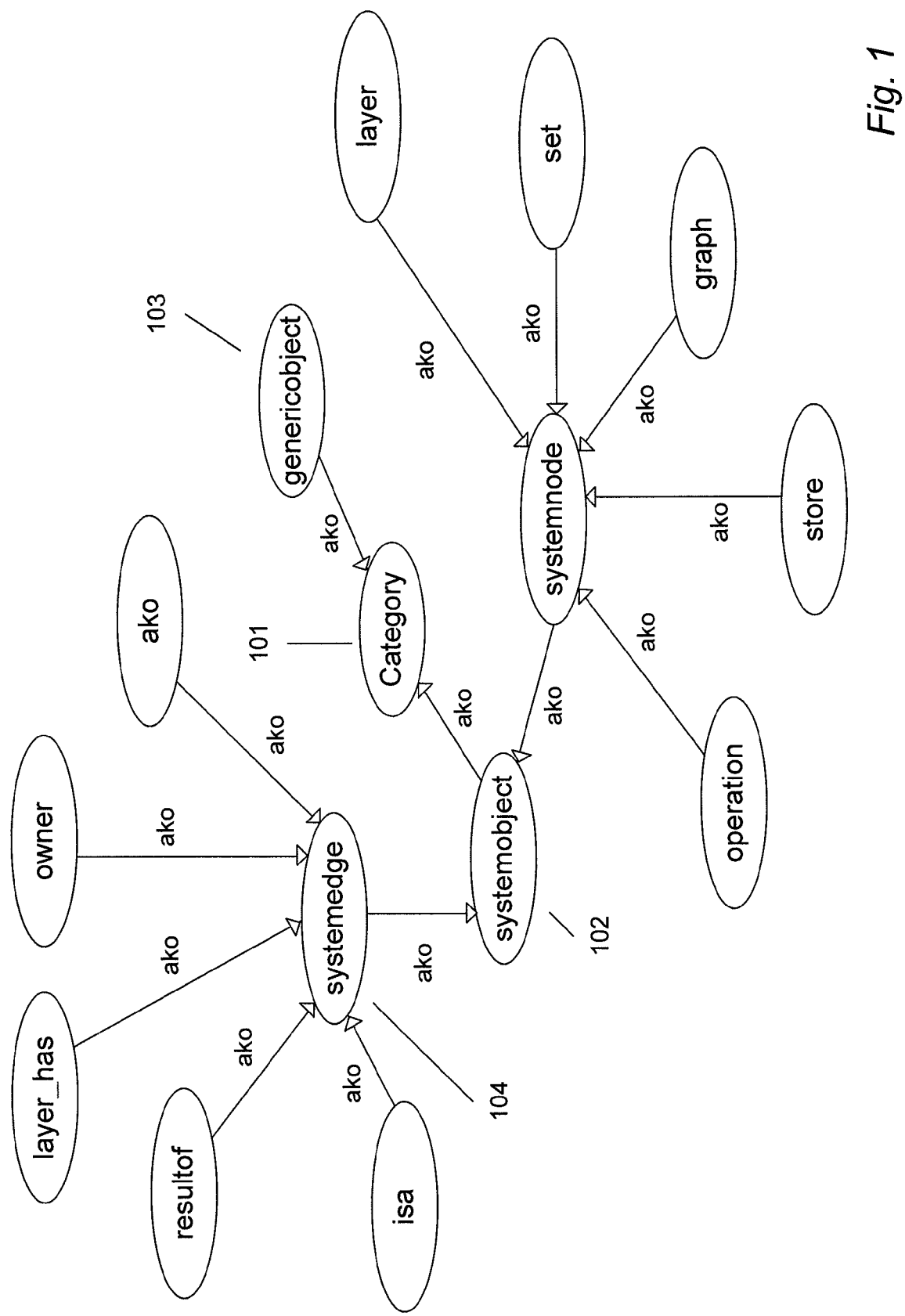
FIG. 1 is a representation of an ontology structure in a graph engine according to one embodiment of the present invention.

The present application is directed to a scalable, graph-centric data storage and analysis system, or graph engine. The graph engine can represent, manage, and store complex, data rich-network structures through the use of a network or "graph" model, which stores and represents actors and relationships in the network as graph structures, instead of table entries in a relational database. The data structure of the graph engine uses graph objects to represent the data, including nodes, edges and graphs. Each of the graph objects may be defined by and coupled with ontological categories of a particular ontology. In a preferred embodiment, the ontology includes a financial/legal ontology—a "concept framework" that models financial interaction as a network of interrelationships between players in the financial world. As will be discussed, utilizing data structures that are composed of graph objects coupled with a particular ontology allows the graph objects to be stored, combined, and represented in a semantically meaningful way, which facilitates data consistency, advanced analytics and visualization of complex networks.

The graph engine manages a database which it uses to store graph objects (the "graph store"). The graph store is the top level of a multi-level containment hierarchy and is configured to provide administrative boundaries to information access. Practically speaking, a single graph store could contain many hundreds of millions or billions of graph objects. Graph stores may additionally contain references to graph objects that are contained in a remote graph store (access to which is controlled by the remote graph store), allowing for the federation of graph stores. If graph stores are federated, the size of the data set that may be maintained by a graph engine becomes effectively unlimited.

The underlying data for the graph engine may be located in a relational database. The graph object cache may mediate all access to the database in both directions (storage and retrieval). The cache may be organized in terms of graph objects and attributes, which correspond to each of the graph objects, and may be indexed by object. Similarly, the graph object cache may index graph objects so that the graph engine inherently knows that a given node has other interconnections, and can find or begin fetching these references quickly.

In the same way that a single graph store's cache allows for high-performance access to graph-based data that is stored in a relational databases, multiple instances of these caches can be federated into a single distributed cache. To accomplish this, one embodiment of the graph engine utilizes cloud-computing to allow a single graph store to scale horizontally while still maintaining a single, consistent view of a potentially large data set. This same basic technique can be used to deploy graph stores which do not directly manage the storage of their graph objects, but instead cache data that is stored in remote graph stores. Additionally, multiple instances of such caches can be federated into a single view, allowing for the deployment of graph engines that sit on top of data ultimately stored in relational databases which are not specifically tied to graph engines.

A graph store may contain a set of graph objects that are collectively referred to as its ontology. The ontology may have a general purpose facility for defining and refining categorical structures and other ontological elements. In other words, the ontology need not be dedicated to a particular ontological domain, such as finance. These facilities are also used to define the overall system ontology, which categorizes the objects used in the implementation of the graph engine itself and can be used to build other ontological structures. Different graph stores can contain different ontological structures, but in a preferred embodiment every graph store contains a base ontology. In order to simplify boot-strapping of the system, the built in ontology may correspond to a small set of unique identifiers that is pre-defined within the graph store. These identifiers may be used the same way in every graph store, to identify the built-in ontological categories and other ontology-related objects that are required by the system itself.

The base ontology may be structured to provide the building blocks to create a specific ontology. To that end, the most important of the built-in ontology may be a node that stands for the concept of an ontological category, which may be called "category." This node contains a reference to itself as its own category: it is the category of all categories, and may be referred to as the "CoC". In general, all categories are represented by nodes, and these nodes include a reference to the CoC, indicating that they represent ontological categories. Similarly, all nodes in a graph store that represent the category of company may have as their ontological category a reference to a company node or some descendant of the "company" node (both of which would include a reference to the CoC to indicate they are ontological categories).

In more complex ontologies, category nodes must be organized into a categorical structure, such as a hierarchy, where categories "lower" in the hierarchy represent specializations (or descendants) of categories "higher" in the hierarchy. For instance, the node that represents the category of company might have several more specific descendant categories that represent specific kinds of companies: holding companies, trusts, etc. To model this using the graph object structure discussed above, the graph engine may include as part of the built-in ontology an edge category called "a kind of." The "a kind of" concept is represented, like all categories, as a node named "a kind of" whose category is "category". In practice, an edge which refers to the "a kind of" node as its ontological category may link, for example, the company category node with a descendant category node, such as holding company, to indicate that the holding company category node is a sub-type of the company category node. The semantic meaning of edges that are marked with the "a kind of" category may be part of the built-in ontology of a graph engine, and may be how the ontological machinery is boot-strapped.

FIG. 1 illustrates one embodiment of a graph engine ontology. The CoC is at node 101. As previously mentioned, the CoC references itself as its ontological category. As can be seen, each of the system object 102 and generic object 103 are descendants of CoC 101, as is indicated by the "a kind of" edge that links the two. Likewise, the system edge node 104 is a descendant of CoC 101 through system object node 102. All of the edges labeled "ako" (short for "a kind of") have as their category the node labeled "ako". The "ako" node may have the CoC node 101 as its ontological category. Indeed, all of the nodes shown in FIG. 1 may refer to CoC node 101 for their ontological categories, as each of the nodes shown in FIG. 1 may be referenced by other nodes in the network, such as node 104, to indicate a categorical type of a financial ontology. By structuring the ontology in a hierarchy, the semantics of both the CoC and the ako relationship type are pre-defined and understood by the graph engine without requiring special processing.

Each graph object stored in a graph store must have certain intrinsic attributes, including a unique identifier (e.g. a unique 128 bit number assigned by the graph store) and an ontological category (also sometimes called their "type"). A node is an indivisible unit of data, and may represent people, places or things, but can also be used to represent abstract ideas such as categories and types. A particular node's meaning may be indicated by reference to a category node of the ontological structure, as described above. In the context of a financial/legal ontology, the ontological category may be a single, indivisible entity, such as a company, person, place, asset, etc. Information about the node or entity is stored as an attribute of the node. For instance, a node that represents A&B Fictional Co. might have an ontological category of company, and might have an attribute named "Stock Symbol" whose value is "XYZ", a "Stock Exchange" attribute whose value is "NYSE", and a "Full Name" attribute whose value is "Alpha and Beta Fictional Company".

Edges may represent relationships and tie a source object to a destination object by means of some semantically meaningful concept, e.g. ownership, family relationship, personal association, etc. The type of relationship may be indicated by an edge's ontological category, and data that correspond to attributes of the edge can be stored on the edge. For example, the fact that Company A owns Company B might be represented as an edge whose category is owns, whose source object is the node that represents Company A and whose destination object is the node that represents Company B. The edge may also include attributes, such as the particular ownership stake. Additionally, the source and destination objects may be either nodes or graphs, so that relationships can be represented where one or both objects are complex situations or graphs instead of single nodes or objects.

In practice, nodes and edges may reference each other within the corresponding data structures and may also be combined to represent real-world corporate structures and networks. These combinations may be semantically meaningful relationships that utilize the graph engine ontology to aid in the analysis and representation of network data. For example, a company may issue some kind of security. This may be stored and visually represented as an edge whose ontological categorical type is issues security, with a node representing the company as its source and a node representing the specific security as its destination. The issues security edge may then make the statement, for example, Company C issued X shares of Class AAA stock on Oct. 1, 2003 by referencing in the edge data structure the node that stands for Company C and the node that stands for X shares of Class AAA stock in Company C. The edge may further be annotated with meta-data about the issuance, such as the date it occurred. In some embodiments, the ontology may contain information about what is allowable for the source and destination of each kind of edge, so an issues security edge could not be made between any two objects, only between objects whose categorical types are allowed—company and security.

Figure 2:
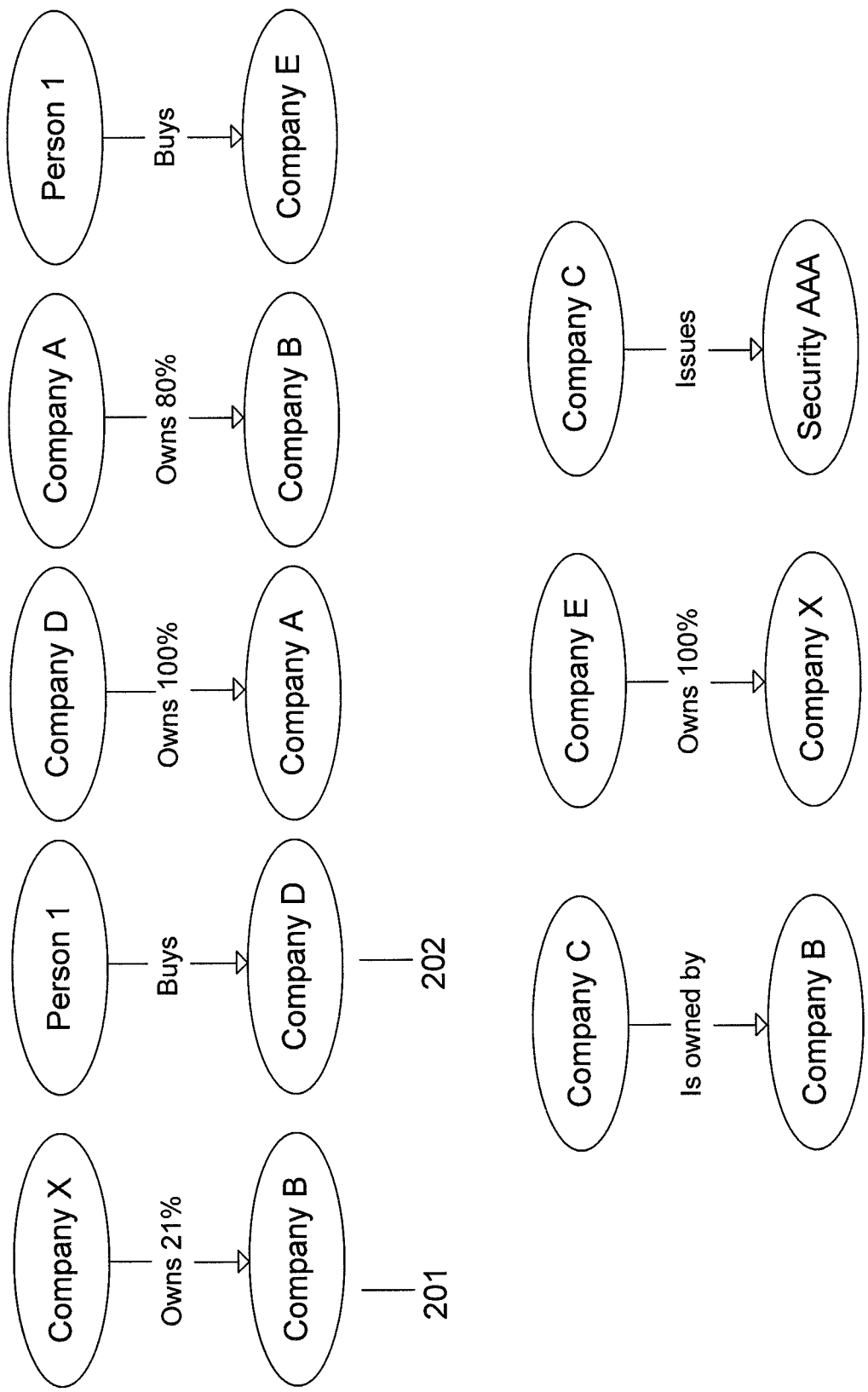
FIG. 2 is a representation of a plurality of ontological relationships incorporating graph structures according to one embodiment of the present invention.

FIG. 2 illustrates an visual representation of node-edge combinations. Each of the nodes and edges may represent data structures stored or indexed within a cache or database as well as a visual representation of an ontological relationship. The node-edge combinations shown in FIG. 2 illustrate part of the plurality of ontological relationships—including node and edge categories—that can be visually represented using a graph engine according to aspects of the present invention. For example, combination 201 includes two nodes corresponding to Company X and Company B. Each of the nodes may be defined in the graph store with an ontological category of company. The edge linking the Company X node and Company B node may be defined within the graph engine database with an ontological category of owns. The edge may also include attributes about the relationship indicated by the edge, such as the ownership is of a 21% interest. When linked, the nodes and edge of the node-edge combination make the semantically meaningful relationship Company X owns 21% of Company B.

Combination 202 of FIG. 1 illustrates another example of a financial relationship that can be modeled using the graph engine with a financial ontology according to a preferred embodiment of the present invention. In particular, combination 202 includes nodes corresponding to Person 1 and Company D. The node corresponding to Person 1 may be defined according to an ontological category of person, rather than company. The distinction between categories is not only useful semantically, but the list of attributes that correspond to a person category may be distinct from the list of attributes in a company category. The edge linking the Person 1 node and the Company D node is notable because its ontological type is an action, buys, rather than a state, owns. This illustrates the wide range of relationships and actions that can be modeled, stored and represented using a graph engine designed according to aspects of this disclosure.

Figure 3:
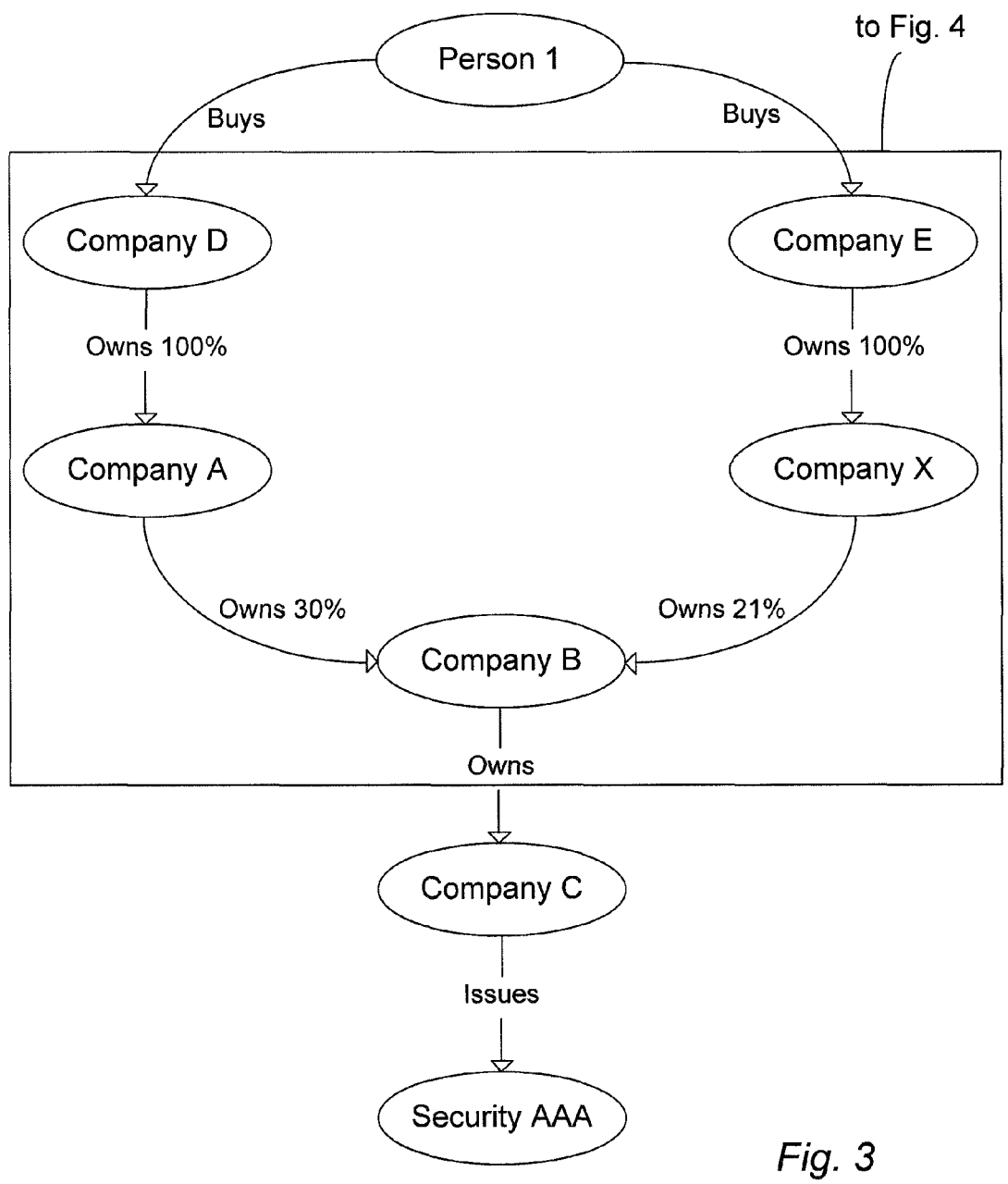
FIG. 3 is a representation of a financial relationship according to one embodiment of the present invention.

Each of the node-edge combinations may be combined to form a network structure, as shown in FIG. 3. This may be accomplished by placing each of the nodes and edges of FIG. 2 into a graph "container". Although the graph of FIG. 3 includes each of the nodes and edges of FIG. 2, the total network of relationships and objects that participate in them need not always be considered; subsets of the overall picture can be created and analyzed independently by creating graphs that contain just the objects and relationships of interest for a particular analysis. This may be performed using a query function that is particularly tailored to the graph-based ontological data structures of the graph engine as presented herein. To that end, the graph of FIG. 3 may be seen as an example of a graph tailored to a particular analysis, with a membership (the nodes and edge of FIG. 2) included within the graph container according to that analysis. For example, the graph of FIG. 3 may be the result of a query to determine the relationship between Person 1 and Company C, or between Person 1 and the Securities AAA. In either case, the representation of the graph shown in FIG. 3 is advantageous because it can be generated automatically by the graph engine using the graph objects discussed above, and is semantically meaningful to a particular query of the graph engine.

Like nodes and edges, the data structures corresponding to graphs may have an ontological category associated with them and may have arbitrary data stored on them. Using these characteristics, graphs can be treated as nodes and edges and can be contained in other graphs, allowing for modeling of complex situations. For instance, a single graph may include nodes and edges corresponding to parents, subsidiaries and ownership relationships that relate to a single company's corporate structure. Because the graph containing the data structures for the company's corporate structure can itself be given an ontological category, such as company, it can be represented as a single node, similar to the company nodes illustrated in FIG. 3. Were the entire corporate structure included, the network representation shown in FIG. 3 would become needlessly complex and hinder a user's ability to process the ontological relationships when presented in a visual manner.

Figure 4:
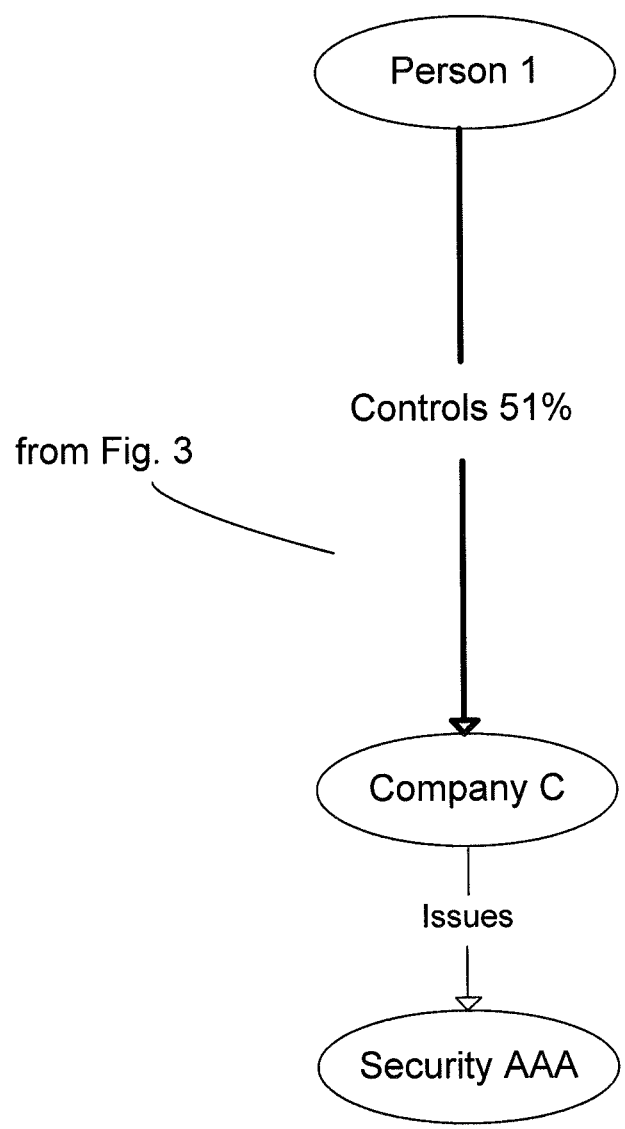
FIG. 4 is a representation of a financial relationship according to another embodiment of the present invention.

Since graphs may have ontological categories like nodes and edges, semantics may be associated with different types of graphs. For instance, a user might query who controls Company C in FIG. 3, yet the graph includes an entire network of ownership relationships. Using the graph structures and ontological relationships defined by the edges, the graph engine may be able to search for and identify ontological categories related to control, such as owns, buys, etc., and find new relationships based on the data found in the data structures, namely that a given person or group of people controls the company by virtue of their direct and indirect ownership of its stock. FIG. 4 identifies this new relationship as an edge between Person 1 and Company C with an ontological category of controls. This edge may represent the circled graph structure from FIG. 3 and include an attribute that is automatically determined by analytics in the graph engine, namely a 51% control interest. The graph engine may determine these relationships using a range of techniques, from simple heuristics to complete reasoning engines. Automated differencing systems can use the ontology present in the graph engine to reason over the data, identify new relationships and performing other related tasks. In a preferred embodiment, the determinations may be made using analytics which specifically utilize the data and ontological structures of the graph engine.

The representations produced by the graph engine may also include a layering of data. Each graph, such as the one in FIG. 3, has at least one layer, but may have an arbitrary number of layers. In one embodiment, a graph may have a stack of layers, each having a separate membership. Each of the layers may be turned on or off, thereby including or excluding the layer from the graph. The union of the memberships of the layers in a graph that are turned on may be considered as the graph's current membership. Turning layers on or off changes this membership, as does adding and deleting layers and adding additional graph objects. The order in which layers are present also has an effect on the membership of the graph, and this order can be changed on the fly.

Utilizing layers in a graph is beneficial because it provides the power to deal with several problematic issues in a uniform manner. For instance, if a particular graph is a complex network of relationships that needs to be analyzed, layers can be used to represent the results of this analysis at different points in time. Each layer may, for example, represent a step in time, and flipping through the layers (turning them on and off by stepping through them in sequence) may present a visual series of pictures, like a flip book, of how a financial relationship or other network relationship may have changed over time.

Membership in a graph includes membership in a layer of the graph; therefore, the same node or edge might be in multiple layers of the same graph at the same time. Accordingly, the graph engine may allow for nodes and edges to have a distinct set of attributes in each layer, in addition to their intrinsic attributes. Just as the layers in a graph might represent time, they might also represent the results of different analyses which have been applied to the same starting point. Thus, the graph engine can be used to "shadow" the values of certain important attributes on a layer-by-layer basis, while still keeping certain underlying attributes constant from the point of view of the application.

In a preferred embodiment, the graph engine may include a query language that allows searches and path-based queries that can take advantage of the typed nature of the graph objects, so that only paths consisting of a certain set of edge and node types will be considered. A graph engine using type-based data structures with pre-defined ontological structure discussed above may also allow basic path finding and graph neighborhood exploration operations, which include computational and algebraic formulae. These operations may leverage the fact that each of the nodes and edges "knows" what they are and how they are interconnected with other graph objects.

Numerical computations across graph structures are common operations, and various styles are supported by the graph engine. For example, one way of using graphs to compute numbers is edge-based: some algebraic formula involving the attributes of an edge or those of its source and destination is specified, and this formula is evaluated over each edge in a collection of edges, such as those that form a path. One formula can be applied along a path between two objects, and another formula may be applied across the results of this formula to produce additional results. For instance, to calculate the percentage of ownership between a holding company and one of its subsidiaries, a first formula may be applied to multiply the value of an attribute stored on the edges along a series of paths; this produces a percentage of ownership as a partial result. A second formula may then be applied to these partial results to add them together and arrive at a total percentage of ownership.

Another analytical approach is identifying possible new edges between nodes based on the types of indirect relationship paths that connect them. This may lead to inferences about the attributes of the objects involved. This can be accomplished either by ad hoc operations that implement ontology- and context-specific analysis or by more using more general tools, such as forward-chaining inference engines to propagate the effects of new relationships. Inferred relationships can be flagged and filtered during analysis.

The graph engine described herein has broad applicability within the field of financial network analysis, as well as within other fields not related to financial network analysis. Additional uses of the graph engine include:

counterparty analysis, wherein groups of interconnected legal entities are analyzed to determine individual or aggregate financial exposure between two or more entities across different types of financial relationships;

systemic risk monitoring, wherein legal entities engaged in financial transactions are analyzed by means of simulations to assess the risk and impact of changes, including financial defaults and failures, on other legal entities;

capital structure analysis, wherein the equity and debt structures of legal entities is analyzed in conjunction with the ownership of the financial instruments related to those structures to assess pricing and valuation discrepancies;

financial fraud, wherein networks of interconnected legal entities are overlaid with information regarding bank accounts, financial transactions and people and analyzed to assess illegal activity; and information and news search, wherein the combinations of nodes, links and attributes resulting from a given query are applied in the form of a Boolean or other query to produce new, prioritized results.

In a preferred embodiment, the graph engine may include visual query-building tools, which facilitate the creation and modification of data queries and analysis through a visual interface. While text queries often involve filtering data or finding direct relationships, the tool has no such limitation.

Figure 5:
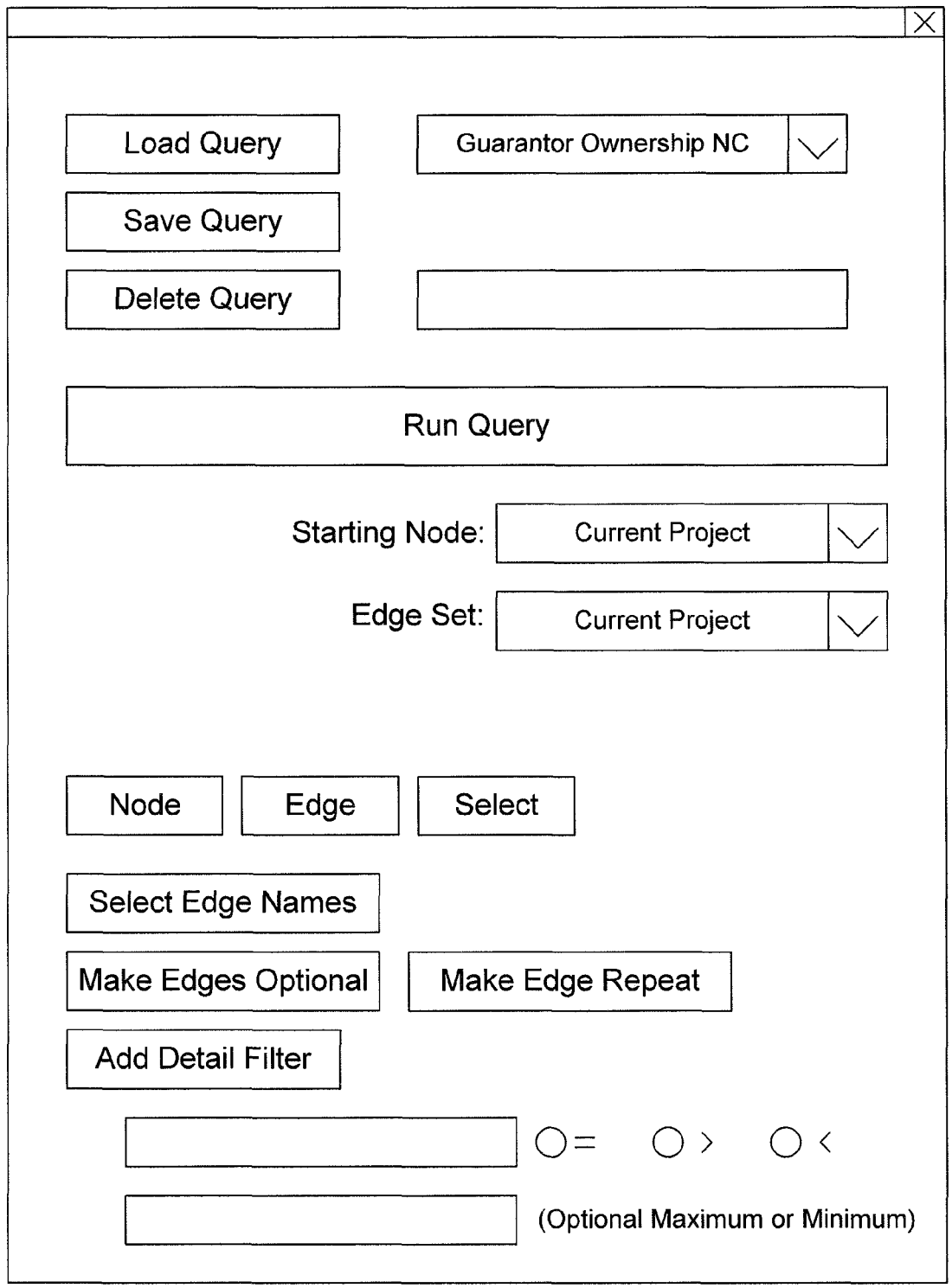
FIG. 5 is an example of a visual interface of a graph engine according to one embodiment of the present invention.

Rather, due to the data structure of the graph engine, the tool may rely on pattern identification that can be constrained by edge and node type, entity name, cardinality or a specific path. All of these constraints can be intuitively specified by the user through the use of the visual interface. One example of the tool's visual interface is the user interface shown in FIG. 5. As can be seen, the user interface provides data fields where a user can, for example, define a starting node and edges set, as well as filter the result or alter the importance of the edge in the query. In some embodiments, selecting the "run query" button will cause the graph engine to search through the data structures within one or multiple graph stores and generate for the user a representation of the results of the query on, for example, a computer screen.

Figure 6:
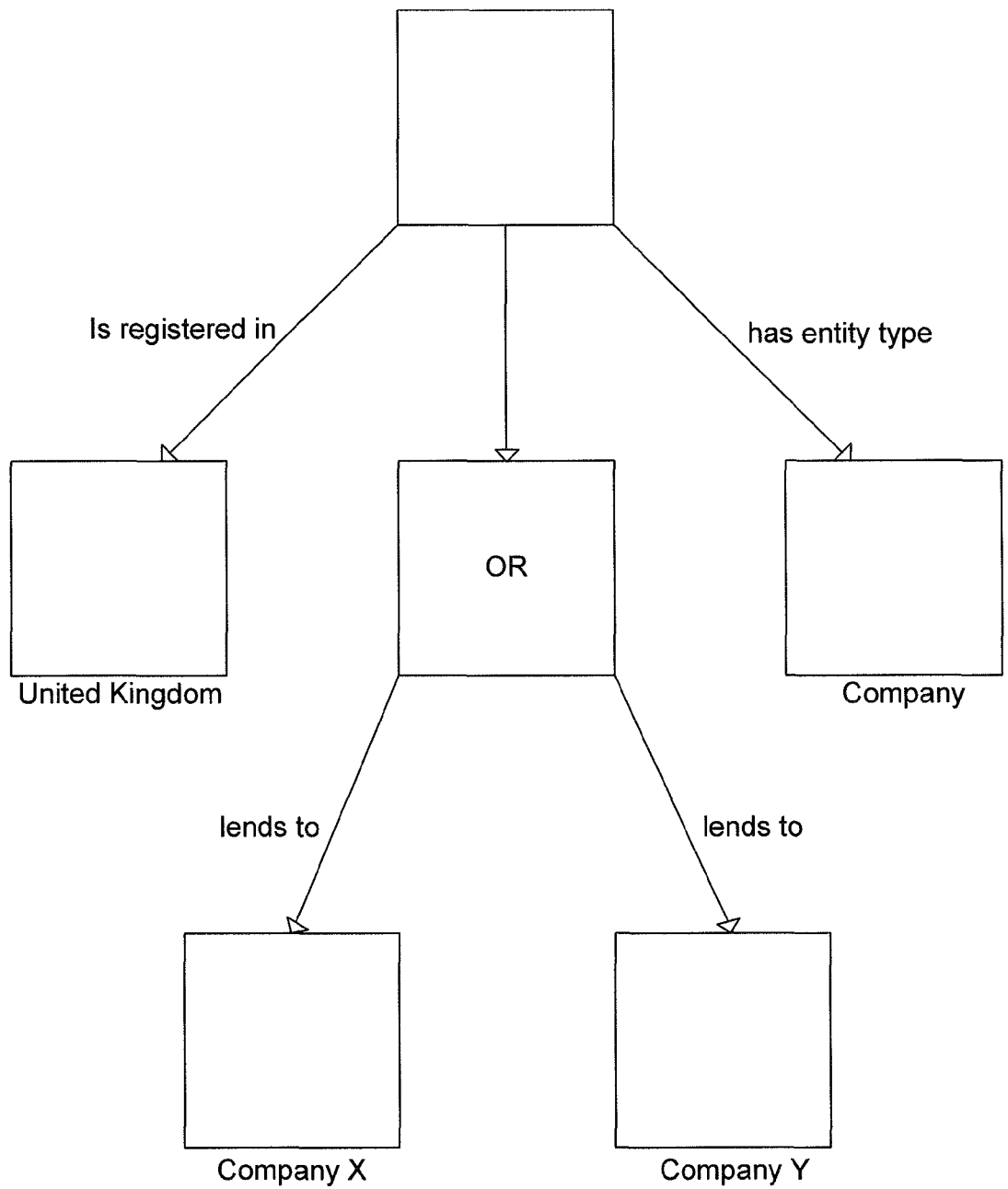
FIG. 6 is a representation of a query generated using one embodiment of the graph engine.

These tools facilitate the quick development and deployment of complex analyses. Nodes are connected with directional edges, specifying patterns. Nodes and edges can be constrained by specifying them with ontological types or by limiting nodes to a list of entities, amongst other means. Since the tool is directly linked to the underlying ontology, relationship and entity inheritance is automatically accounted for when building the queries. Edges may be optional or have their cardinality specified with a range of values. The image in FIG. 6 provides a representation of a query built by the graph engine tool. The query shown in FIG. 6 is composed of multiple nodes and edges. The query may seek an entity that is registered in the United Kingdom, that lends to Company X or Company Y, and that has entity type company.

Boolean operators And, Or and Not exist to provide branching and may be nested to create complex logical statements. The query's input and output may be customized, and named queries may be saved, deleted, modified and executed. Queries can also exist in XML, providing they follow the graph engine's XML query schema which describes valid structures of querying. Named queries may contain a list of operations, each with its own parameters. A display layer also allows several layout features to execute when the query is complete.

Figure 7:
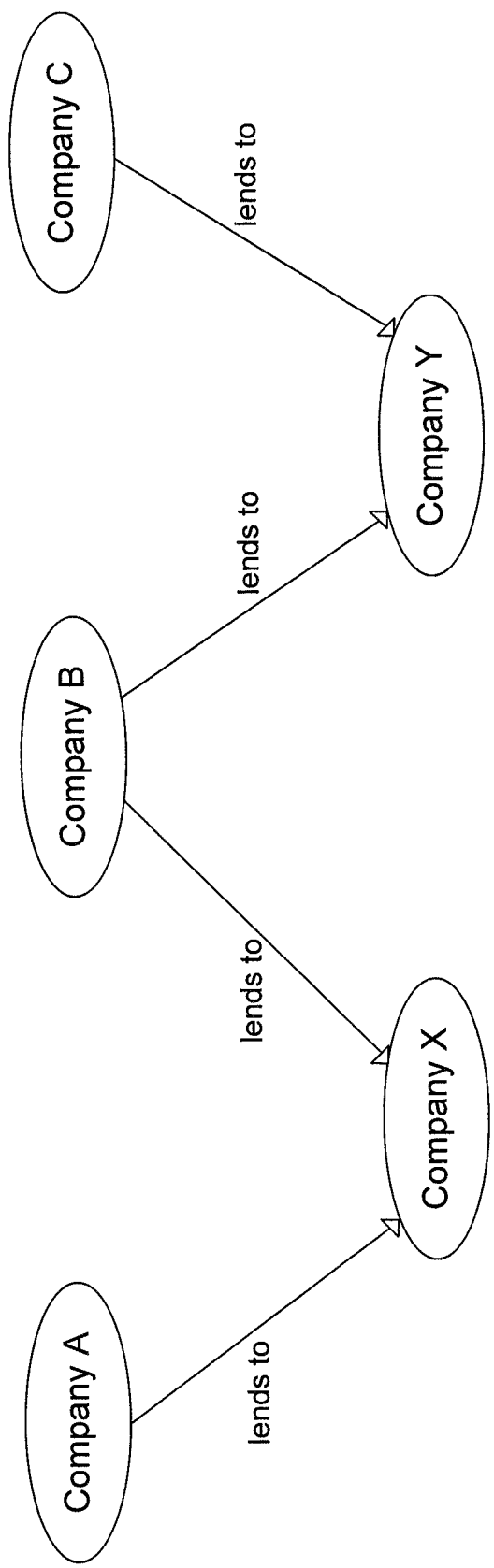
FIG. 7 is a representation of a financial relationship according to one embodiment of the present invention.
Figure 8:
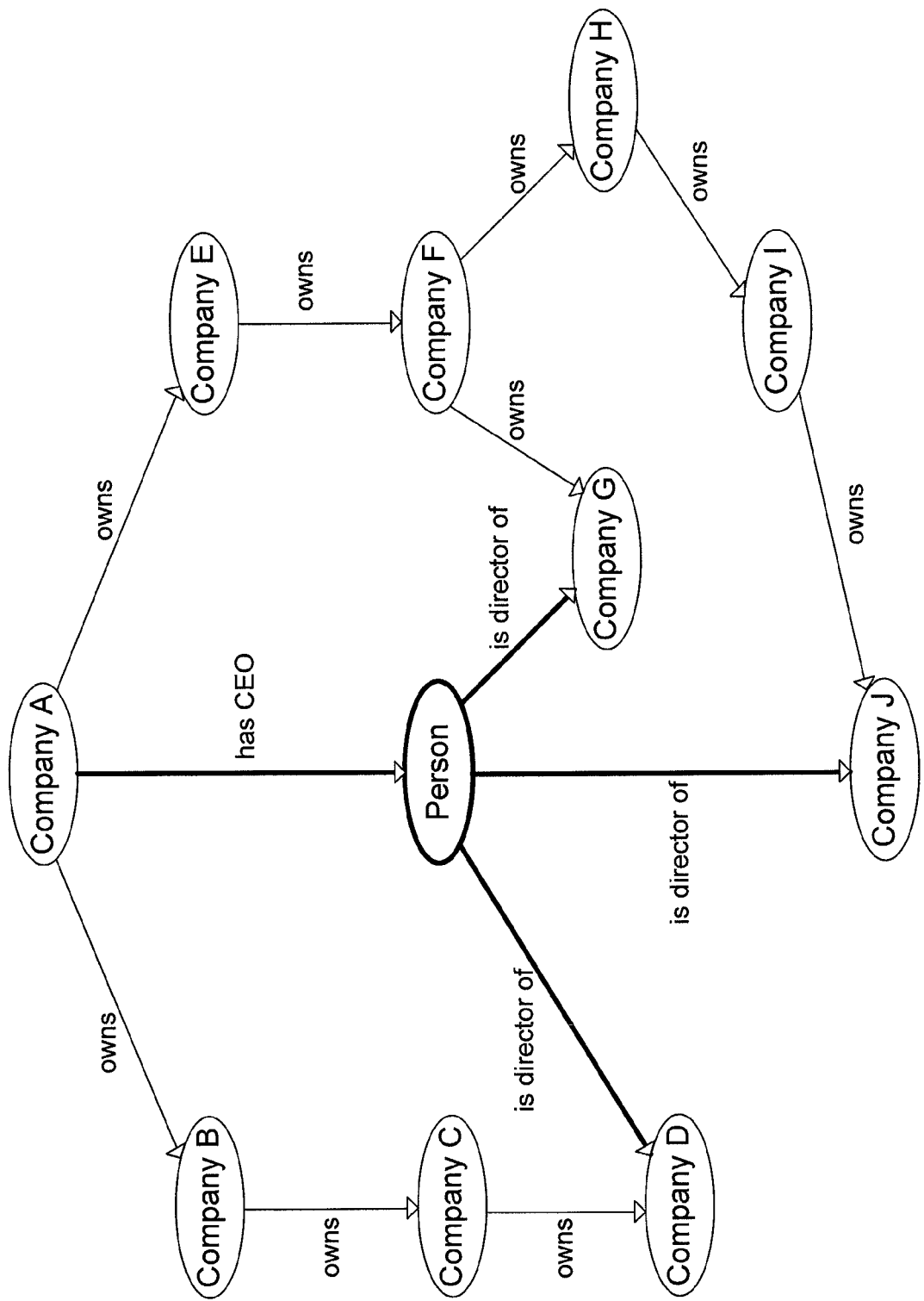
FIG. 8 is a representation of a financial relationship according to one embodiment of the present invention.
Figure 9:
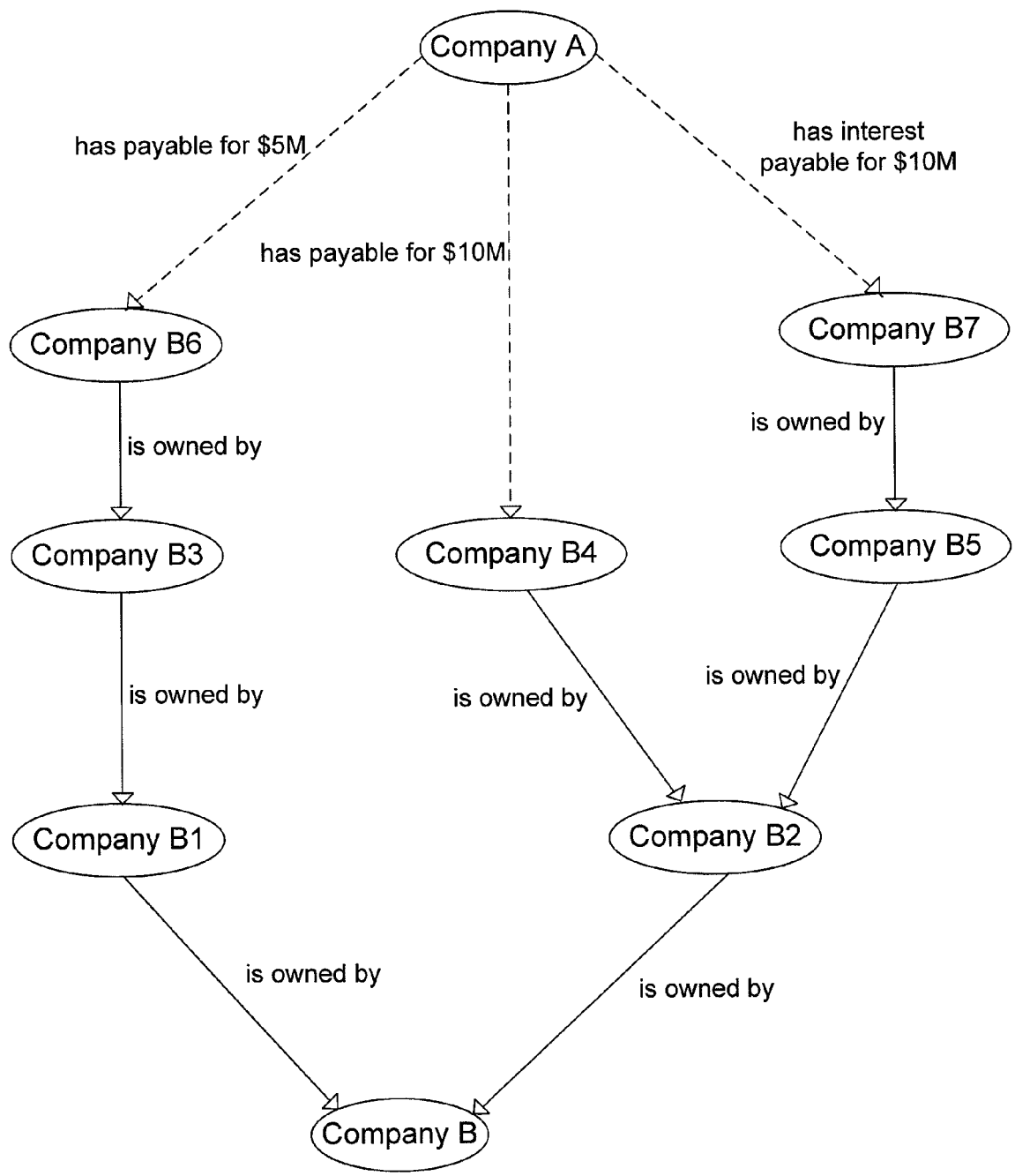
FIG. 9 is a representation of a financial relationship according to one embodiment of the present invention.
Figure 10:
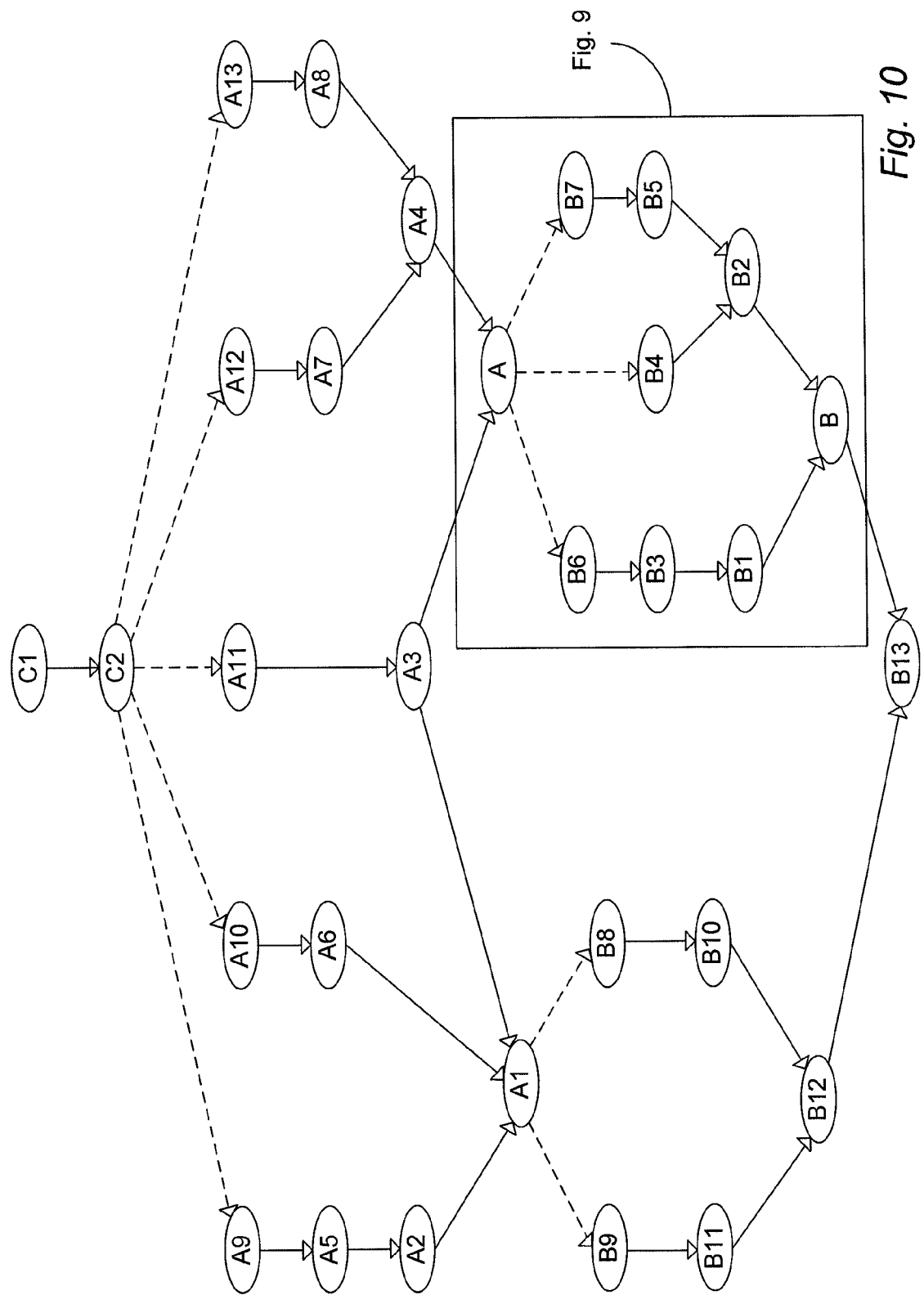
FIG. 10 is a representation of a financial relationship that incorporates the representation of FIG. 9, according to one embodiment of the present invention
Figure 11:
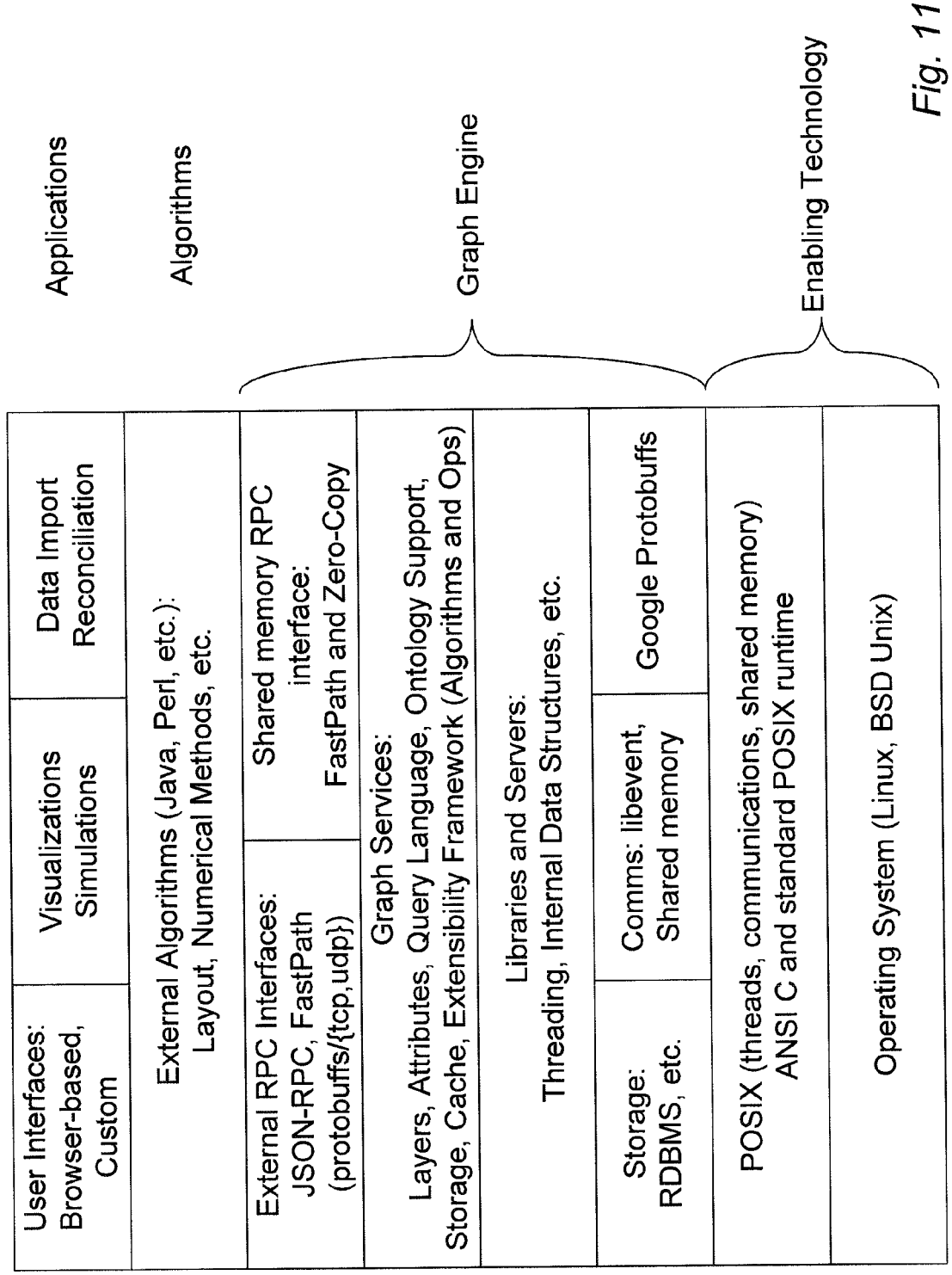
FIG. 11 is one example of a technology stack used to implement a graph engine according to one embodiment of the present invention.

Queries may result in numerous types and configurations of representations, depending on the query parameters. The representations may be visual and may include either text, numbers, graph objects, or some combination of the these. FIG. 7 is an example of a representation that may result from the query illustrated in FIG. 6. FIGS. 8-10 are other examples of representations. Collectively, FIGS. 7-10 illustrate some of the complex relationships that can be represented using the graph engine as discussed herein.

The representation of FIG. 8 visually identifies Person A's connection to numerous companies in a single corporate structure by using edges with ontological categories such a is director of and has CEO. The representation may differentiate between nodes and edges of different ontological types, as shown, to aide in the analysis of a representation. For example, the bold lines in FIG. 8 may represent edges which include, as either a source or destination object, a node with an ontological type of person.

The representation of FIG. 9 similarly distinguishes between edges. The dashed edges of FIG. 9 indicate that the source and destination nodes are in a counterparty relationship, meaning that there is a financial liability between the two parties. A query which results in the representation of FIG. 9 may include as parameters Company A and Company B, as well as a parameter set to identify any financial liability that Company A has to Company B (including through Company B's subsidiaries B1-B7). This may be especially useful in both the counterparty analysis and systemic risk monitoring applications mentioned above.

Other queries may result in representations that are more or less complex than the one shown in FIG. 9. FIG. 10, for example, is more complex than the representation in FIG. 9 and, in fact, includes the representation of FIG. 9 as a subset (see the boxed area). The semantic descriptions of the edges have been omitted in FIG. 10 to highlight the structure of the representation. In other embodiments, the representation of FIG. 10 may be a subset of an even larger representation. For instance, instead of representing the relationship between the corporate structure of companies A, B, and C, the graph engine may generate a representation that includes the corporate structure of hundreds of companies.

In a preferred implementation, the graph engine may utilize both remote procedure call (RPC) protocols and group communications at different levels. For example, the graph engine may use standard client/server RPC for access by normal client programs, such as analytical tools and user interfaces, as well as hybrid peer-to-peer RPC for non-group-based backend communication and control, such as RPC over shared memory or UDP. The graph engine may also use peer-to-peer for graph operations, which provide a way to integrate algorithms, external data sources, simulations, inference-based systems, and other analytical tools in a way that keeps the computation "close" to the data. The core of the graph engine system may be based on the industry-standard POSIX system application programmer interface (API), as is shown in FIG. 7. The core of the system may be implemented in ANSI C, which provides an extensibility framework for adding algorithms and interfaces to external tools easily, using any modern programming language. Interfaces suitable for all modern programming languages may be implemented and range from high-performance access via shared memory to web-centric protocols such as JSON-RPC or FastPath.

A web-based user interface (UI) may be implemented using AJAX techniques, and run in modern, standards-compliant browsers including Firefox, Microsoft Internet Explorer and Google Chrome. The UI may be written in JavaScript and use JSON-RPC to communicate with the graph engine back end. The UI may be pure client that connects to the graph engine using an RPC protocol. Some UIs may be able to utilize most API calls in the RPC interface of FIG. 7, which means it can create and destroy graph objects, modify them, invoke operations, poll for events, etc. One example of such a UI is the data input interface mentioned above. The algorithm layer shown in FIG. 7 may include a number of algorithms that leverage the graph-based, ontological data structures of the graph engine presented herein.

Computer readable instructions corresponding to the graph engine may be saved on any of a variety of storage media, such as hard drives, flash drives, recordable media, etc. The instructions may be processed in one or more microprocessors, which are coupled to the storage media, and which reside in a variety of information handling systems, as is well known in the art. Information handling systems generally process, compile, store, and/or communicate information or data for business, personal, or other purposes thereby allowing users to take advantage of the value of the information. In some embodiments, the information handling system may include a client computer, a server system, or some combination of the two. In other embodiments, the graph engine may run on a plurality of information handling systems, each distributed throughout a network, such as a WAN or LAN.

Figure 12:
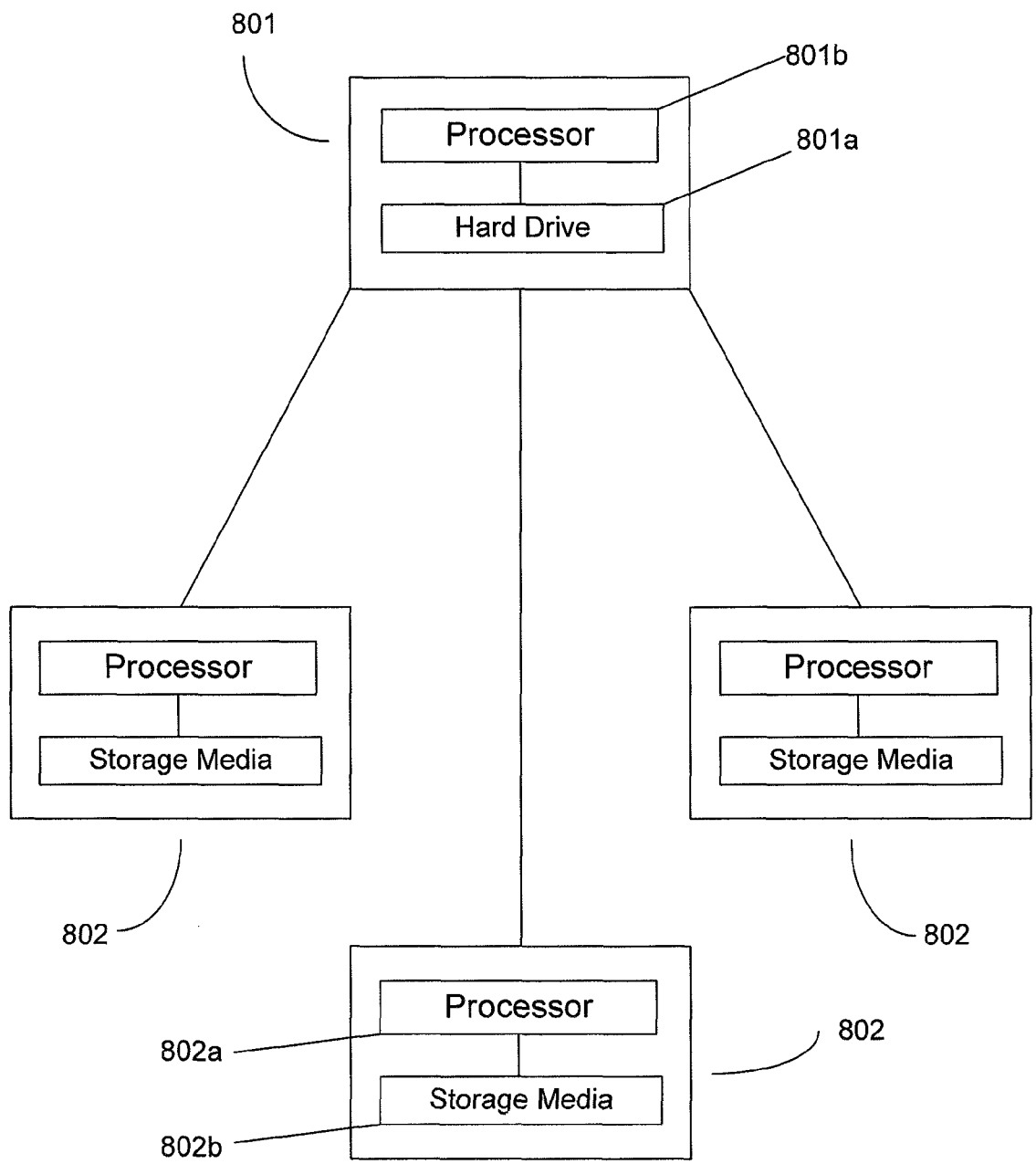
FIG. 12 is one example of a computing system in which the graph engine may run.

FIG. 12 illustrates one embodiment of a computing system in which the computer readable instructions corresponding to the graph engine may be stored and processed. FIG. 12 shows an information handling system 801 that is connected to a plurality of server systems 802. The information handling system 801 may include a hard drive 801a, on which the computer readable instructions for the graph engine are stored, and a microprocessor 801b, which may be coupled, either directly or indirectly, to the hard drive 801a using a plurality of busses. The information handling system 801 may be coupled to a plurality of server systems, each of which includes a processor 802a and storage media 802b. The information handling system 801 may be coupled to the server systems 802 via cables or other well known connections. Part or all of the computer readable instructions for the graph engine may be located in the storage media 802b of the server systems 802 and processed using processors 802a. Alternatively, the computer readable instructions may be processed using processor 801b, and the information handling system 801 may direct the server systems 802 to take particular actions based on the computer readable instructions of the graph engine.

Beyond the issues of representation and query, the graph engine is advantageous because it provides a framework for the storage and sharing of complex, network-based data, and relieves application code (e.g. analytics) from the burden of dealing with databases, data formats, or other peripheral issues. The graph engine framework may be hardware, software or a combination of both that is programmed using one of number programming languages well known in the art. The graph engine framework, in addition, may provide mechanisms for connecting analytical tools written in nearly any modern programming language, for deploying these analytical tools in scalable computational environments ranging from single servers to loosely connected multiprocessors to various forms of cloud-computing infrastructures. The graph engine may also be designed to enable the combination, or federation, of multiple graph stores into a single view of their combined data, while providing mechanisms for protecting the ultimate owners of this data from undesired exposure of or access to their own part of the federated whole.

Although the present disclosure has been described in detail, it should be understood that various changes, substitutions, and alterations can be made hereto without departing from the spirit and the scope of the invention as defined by the appended claims.

What is claimed is:

1. A method for providing an analytical and visual depiction of relationship data, comprising:
providing a plurality of graph objects to an information handling system comprising a processor coupled a storage medium;
categorizing each of the plurality of graph objects at the processor using instructions located in the storage medium;
displaying at least some of the plurality of graph objects in a visual form representing a network structure, wherein the visual form is determined, at least in part, according to the categorization of each of the plurality of graph objects.

2. The method of claim 1, wherein the plurality of graph objects includes nodes, edges, and graphs.

3. The method of claim 2, wherein categorizing each of the plurality of graph objects includes referencing at least one of a plurality of ontological categories.

4. The method of claim 3, wherein at least some of the plurality of ontological categories correspond to a financial ontology.

5. The method of claim 3 wherein each of the plurality of ontological categories is a graph object.

6. The method of claim 1, wherein the method further includes the step of receiving a query regarding at least one of the plurality of graph objects.

7. The method of claim 6, wherein the plurality of graph objects included in the visual form is determined, at least in part, according to the received query.

8. The method of claim 1, wherein each of the plurality of graph objects includes a plurality of layers and each layer is associated with at least one attribute.

9. A method for creating an analytical and visual representation of a network, comprising:
determining a plurality of ontological categories at a processor of an information handling system using instructions located in a storage medium coupled to the processor, wherein each of the plurality of ontological categories corresponds to a segment of a network;
collecting at the processor data corresponding to a plurality of graph objects, wherein
each of the plurality of graph objects corresponds to one of the plurality of ontological categories; and
each of the plurality of graph objects includes a plurality of layers and each layer is associated with at least one attribute; and
displaying the graph objects in a visual form that displays the network.

10. The method of claim 9, wherein the plurality of graph objects includes nodes, edges, and graphs.

11. The method of claim 10, wherein nodes correspond to indivisible units of data, edges correspond to relationships between two items, and graphs are containers with which nodes, edges, and graphs may be associated.

12. The method of claim 11, wherein collecting data corresponding to the plurality of graph objects includes collecting data through a visual interface.

13. The method of claim 11, wherein collecting data corresponding to the plurality of graph objects includes applying an analytical function to one or more of the plurality of graph objects.

14. The method of claim 11, wherein the nodes and edges are all typed according to one or more of the plurality of ontological categories.

15. The method of claim 9, wherein each of the plurality of graph objects includes at least one individual attribute.

16. The method of claim 9, wherein the network is a financial network.

17. A method for creating an analytical and visual representation of a network, comprising:
receiving in an information handling system data corresponding to the network, wherein the information handling system comprises a processor and a storage medium coupled to the processor;
automatically dividing the data into a plurality of graph structures at the processor using instructions located within the storage medium, wherein each graph structure corresponds to a pre-defined ontological category;
receiving through an interface of the information handling system one or more parameters; and
displaying at least some of the graph structures on the basis of the one or more parameters received through the interface.

18. The method of claim 17, wherein the visual form is displayed on a monitor of the information handling system.

* * * * *